Jan. 4, 1949.  J. W. FAY ET AL  2,458,360
CLOSURE DEVICE
Filed Feb. 23, 1944  2 Sheets—Sheet 1
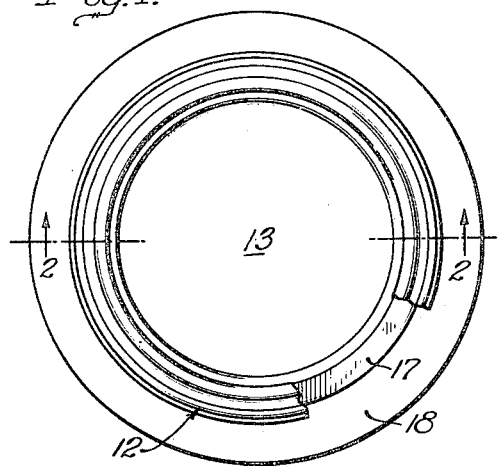
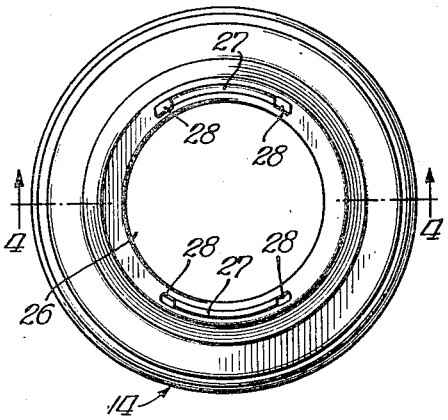
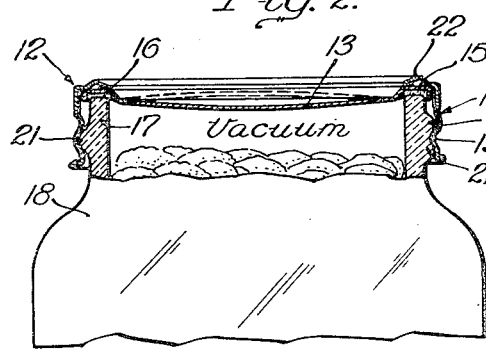
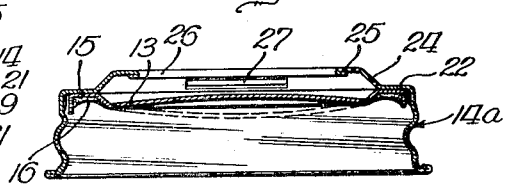
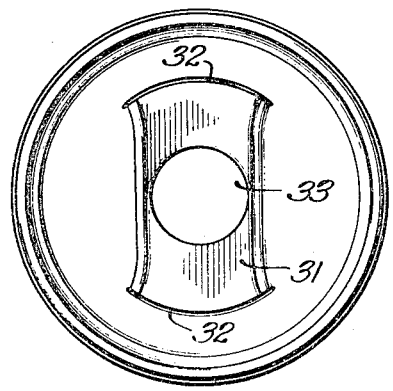
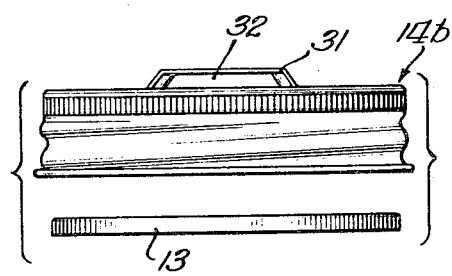
INVENTORS:
Joseph W. Fay
and Rudolph Fay Jan. 4, 1949. J. W. FAY ET AL 2,458,360
CLOSURE DEVICE
Filed Feb. 23, 1944 2 Sheets-Sheet 2
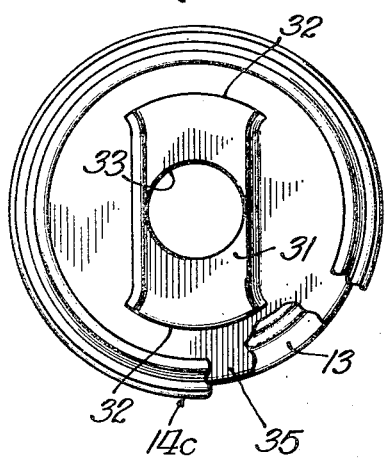
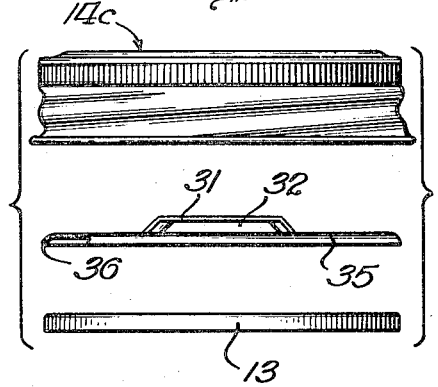
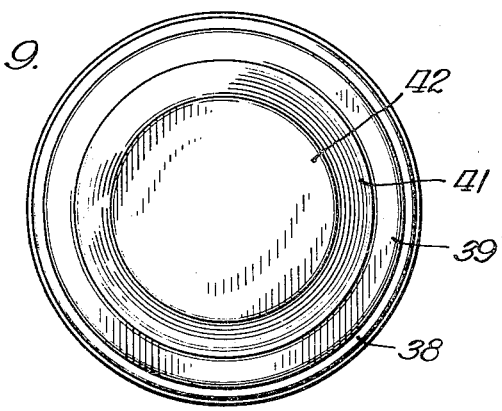
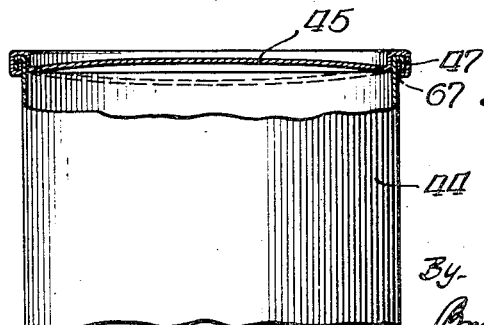
INVENTORS:
Joseph W. Fay
and Rudolph Fay Patented Jan. 4, 1949

2,458,360

UNITED STATES PATENT OFFICE 2,458,360

CLOSURE DEVICE

Joseph W. Fay and Rudolph Fay, Villa Park, Ill.; said Rudolph Fay assignor to said Joseph W. Fay Application February 23, 1944, Serial No. 523,536

2 Claims. (Cl. 215—43)

This invention relates to closure devices, and particularly to closure devices for employment with receptacles such as jars, bottles, cans and the like, adapted for the preservation of comestibles.

In the preserving of comestibles, it is the common practice to clean and sterilize the receptacles in hot water and to place the comestibles in a heated condition in the heated receptacle, after which the receptacle is closed and sealed by a suitable closure device or cap. In some cases, the filled receptacle is then allowed to cool before being placed in storage while in other cases the closed receptacle is placed in a pressure cooker for a period of time for further processing, before cooling and storage. In either case, the primary function of cooking and/or processing of the food is not only to make it more palatable but also to destroy to the greatest possible extent any bacterial agents or fungi that might later cause fermentation resulting in spoilage of the food.

It will readily be apparent then that if the comestibles are to be maintained in the manner and under the conditions specified, that an air tight seal must be secured and maintained between the closure device and the receptacle. Due to various uncontrollable factors, it is not always possible to maintain an air tight seal with the result that over a period of time air will seep into the receptacle and contaminate the comestibles with resulting spoilage thereof and possible ill effects upon the consumer if they should be consumed. The problem then arises as to how it may readily be determined whether or not an effective seal has been secured at substantially the time the closure device is secured to the receptacle and, additionally, whether or not such a seal has been maintained over a period of time. No consumer can determine merely by looking at the receptacle or the comestibles therein whether or not the latter has been contaminated, unless it be that putrefaction has progressed to such an extent that it is clearly visible on the food or is evidenced by bulging of the closure device or receptacle under influence of the gases generated therein. In the latter case the fact is obvious, but in the time between the sealing of the receptacle and the time that the fact becomes obvious there is not, so far as is now known, any method or means by which the consumer can be assured that the comestibles in the receptacle have not become contaminated.

The present invention has for its primary purpose the provision of a closure device of such a nature that a consumer can readily be apprised, either through the sense of hearing or touch, whether or not an effective seal has been secured when the closure device is placed upon the receptacle and whether or not such a seal has been maintained over a period of time.

Where a tight seal is initially obtained between the closure device and receptacle, it is known that as the hot food and receptacle are cooled a vacuum is created in the receptacle, which phenomena has been of material assistance in maintaining such seal over a period of time. The present invention contemplates utilization of such phenomena in conjunction with a closure device having a curvilinear top portion. That is, the closure device is in the form of a cap having a top portion of convex form that is capable of being moved from its normal convex form to assume a concave form, and vice versa. When the cap is placed on the receptacle, the top portion is moved to assume its concave form and, by reason of the vacuum in the receptacle, is held in such form by atmospheric pressure. There is a definite "click" produced when the cap top is moved to assume its different forms. By use of such a cap, the consumer can readily determine whether or not the food in a receptacle is still in good condition. If a tight seal is not obtained in the first instance, no vacuum will be developed in the receptacle and the cap top will not be held in concave form. On the other hand, if there is seepage of air into the receptacle over a period of time, the vacuum therein will gradually be destroyed and the cap top will be moved from its concave form to its convex form. Also, if the food begins to spoil by reason of being improperly cooked and/or processed, the gases generated by the spoiling food will destroy the vacuum in the receptacle permitting the cap top to assume its convex form, and before the food shows evidence of such spoilage. By simply pressing on the cap top the consumer is apprised of whether or not the food in the receptacle is in good condition. That is, if the cap top is in concave form, the consumer knows that a good seal has been obtained and maintained. If the cap top moves from its convex to its concave form under pressure, this fact, together with the audible "click" emitted by the cap top upon being so moved, will apprise the consumer that air has been admitted to the receptacle and that the food therein has been subjected to possible contamination.

It is a further object of this invention to provide a cap as above described with suitable means to assist in applying it to and removing it from a receptacle, and particularly the arranging and disposing of such means on the cap so as not to interfere with the cap being employed in the manner and for the purpose above described.

Still further objects and advantages of the invention will in part be obvious and in part hereinafter pointed out, and thereby consist generally in the features of construction, combination of elements and arrangements of parts which will be exemplified in the constructions to be described, and of which the scope of application will be indicated in the appended claims.

In the accompanying drawings, in which is shown the preferred illustrative embodiments of the invention—

Figure 1 is a plan view, parts being broken away, showing a closure device embodying the principles of the present invention applied to a receptacle;

Figure 2 is a view, partly in elevation and partly in vertical section of the closure device and receptacle of Figure 1, this view being taken substantially along the plane of the line 2—2 of Figure 1;

Figure 3 is a plan view of a modified form of closure device embodying means permitting application of an implement thereto for applying it to or removing it from a receptacle;

Figure 4 is a vertical sectional view of the closure device of Figure 3, being taken substantially along line 4—4 of said latter Figure;

Figure 5 is a plan view of a second modified form of closure device embodying modified means permitting application of an implement thereto for applying it to or removing it from a receptacle;

Figure 6 is an exploded elevational view of the component parts of the device of Figure 5;

Figure 7 is a plan view of a third modified form of closure device embodying modified means for the purpose specified in connection with the device of Figures 3 and 5;

Figure 8 is an exploded sectional view of the component parts of the device of Figure 7;

Figure 9 is a plan view of a modified form of closure device in the form of a cap embodying the principles of the present invention;

Figure 10 is a view, partly in elevation and partly in vertical section, of the cap of Figure 9; and Figure 11 is a view, partly in elevation and partly in vertical section, illustrating the principles of the present invention applied to the usual food preserving can.

Referring now in detail to the drawings, and particularly to Figures 1 and 2 thereof, there is shown a closure device 12 of substantially the usual construction. It is of two part construction and comprises the diaphragm or disk 13 and the cooperating annular member 14. Disk 13 has the usual annular channel 15 formed about its periphery for the reception of the usual sealing gasket 16, which gasket is adapted to seat on the open neck 17 of the receptacle 18. The member 14 is in the shape of a ring comprising the skirt 19, threaded to cooperate with the external threads 21 on neck 17, and the generally inwardly directed annular flange 22 which is adapted to exert pressure on the channel portion 15 of disk 13 to force gasket 16 into sealing engagement with the neck 17 when the member 14 is threaded on the receptacle. Inwardly of flange 22, member 14 is relieved of metal to permit access to the disk 13.

In accordance with the principles of the present invention the disk 13 is preferably formed of metal and is so constructed that it normally will be convex in form, but may be moved from such convex form to assume a concave form. The strength of the metal should be such that movement of the disk to its different forms will be accompanied by an audible "click." The area of movement of the disk may extend across the entire diameter of the disk or it may be confined to the central portion thereof. The disk should normally be capable of remaining in its convex form until moved to its concave form by hand. In this latter form the disk should be capable of being retained in such form by atmospheric pressure or, in other words, by the difference in pressure without and within the receptacle. Should the pressure within and without the receptacle become equalized, as by destroying of the vacuum in the receptacle by leakage of air thereinto, then the disk should be capable of assuming its convex form. With a disk so constructed and operating in the manner described, a consumer may instantly be apprised as to whether or not the contents of a receptacle have been subject to contamination. When the receptacle has been packed and cooled the disk may be moved to and will be held in its concave form by the difference in pressure on opposite sides of the disk. So long as the disk remains in this latter form, which the consumer may test by hand, the consumer will know that the contents of the receptacle have not been subject to contamination. If, however, the consumer finds at any time that the disk has returned to its convex form, then he or she will know that either the cooking and/or processing of the contents of the receptacle has not been done correctly indicating that putrefaction has developed, or that the seal between the disk and the receptacle has been broken and that the contents of the receptacle have been subject to contamination.

The modified form of closure device shown in Figures 3 and 4 employs the component parts of the device of Figures 1 and 2, constructed and arranged to operate in the manner described. The member 14ª is, however, more in the nature of a cap having the diagonal wall 24 inclined inwardly and upwardly and terminating in the horizontal inwardly directed annular flange 25. Inwardly of flange 25, the cap is relieved of metal to provide the relatively large opening 26 for access to the curvilinear disk 13. At diametrically opposite points, slots 27 of suitable width to receive an implement, such as a case knife, are formed in wall 24. Portions of the metal cut to define the slots are not removed but are bent back against the wall to provide reinforcements 28 for the wall and against which the implement may abut when slipped through slots 27 and employed as a lever to tighten the cap on the receptacle or to remove it therefrom.

The member 14ᵇ of the modified form of closure device shown in Figures 5 and 6 is in the form of a cap having a planar top portion from which is formed a centrally raised portion or boss 31 of generally rectangular shape. Slots 32 are formed in the opposite shorter ends of the boss, and such slots, together with the boss, are of sufficient width to receive an implement, such as a case knife, the knife preferably abutting the inner surface of the longer walls of the boss to act as a lever to screw the cap onto and off of the receptacle. An opening 33 is formed centrally of the boss through which a finger may be inserted to come into contact with the curvilinear disk 13 in the manner and for the purpose hereinbefore specified.

Figures 7 and 8 illustrate a closure device formed of three parts, comprising the curvilinear disk 13, the retaining ring 14c and the implement receiving part 35. In general, this form of device is similar to the device of Figures 5 and 6, except that member 14c does not have the planar top portion but is in the form of a ring as in the devices of Figures 1 and 2. The implement receiving portion 35 is in the form of a disk having the slightly downturned peripheral edge 36 for cooperation with the curvilinear disk 13. This disk 35 likewise has the upwardly pressed generally rectangular boss 31 provided with the slots 32 and the finger opening 33 for the purposes hereinbefore described. In assembled relation, the disk 35 is clamped between ring 14c and the disk 13.

Figures 9 and 10 illustrate a closure device formed from a single piece of metal and comprising the threaded skirt 38 having the horizontal flange 39 from which extends the inwardly and upwardly directed wall 41 terminating in the top portion 42. This top is made curvilinear in any or suitable or preferred manner in order that it may be moved from a convex form to a concave form in the manner and for the purpose previously described.

In Figure 11, the principles of the present invention are shown applied to the usual preserving can 44 in that the top 45 secured to the can by the crimped flanges 46-47 is made of a material that will permit it to be moved from a convex to a concave form whereby the consumer may be provided with an indicator as to the condition of the contents of the can.

While preferred embodiments of the invention have been illustrated and described, by way of example, it will be obvious that changes may be made therein within the spirit and scope of the invention and, therefore, the invention is not to be limited to the precise forms herein described, except insofar as they may so be limited by the appended claims.

We claim:

1. A closure device for receptacles wherein a vacuum is developed in the receptacle by cooling of the contents thereof, comprising a curvilinear sealing disk characterized by its ability to be held in concave form by the greater pressure externally of the receptacle and capable by its inherent resiliency of assuming a convex form when the pressure upon opposite sides of the disk becomes substantially equalized, a cap having a skirt portion for threaded engagement with said receptacle and a portion adapted to engage and urge said sealing disk into sealing engagement with said receptacle, a boss pressed upwardly from the top of said cap and having a slot at two opposite ends thereof to receive an implement for turning said cap onto and off of said receptacle, and said boss having a central opening through which access may be had to said sealing disk.

2. A retaining member for use with a flexible sealing disk for receptacles comprising a threaded skirt portion for engagement with external threads on said receptacle, a top wall on said retaining member having a portion thereof engageable with said sealing disk to urge it into sealing engagement with said receptacle, and a boss pressed upwardly from said top wall and having a slot at two opposite ends thereof into which an implement may be inserted to rotate said retaining member, said boss having a central opening through which access may be had to said sealing disc.

JOSEPH W. FAY.
RUDOLPH FAY.

REFERENCES CITED

The following references are of record in the file of this patent:

UNITED STATES PATENTS

| Number | Name | Date |
|---|---|---|
| 25,894 | Fridley et al. | Oct. 25, 1859 |
| 131,003 | Howson | Sept. 3, 1872 |
| 225,752 | Griswold et al. | Mar. 23, 1880 |
| 726,451 | Norton | Apr. 28, 1903 |
| 727,808 | Knowlton | May 12, 1903 |
| 1,152,107 | Kerr | Aug. 31, 1915 |
| 1,186,274 | Brosius | June 6, 1916 |
| 1,237,640 | Hammer | Aug. 21, 1917 |
| 1,318,112 | Savage | Oct. 7, 1919 |
| 1,570,732 | Emerson | Jan. 26, 1926 |
| 1,610,939 | Fay | Dec. 14, 1926 |
| 1,999,622 | Algeo | Apr. 30, 1935 |
| 2,027,430 | Hansen | Jan. 14, 1936 |
| 2,040,798 | Schoonmaker | May 12, 1936 |
| 2,046,227 | White | June 30, 1936 |
| 2,089,392 | Martinelli | Aug. 10, 1937 |
| 2,094,567 | Barnby | Sept. 28, 1937 |
| 2,131,775 | Waring | Oct. 4, 1938 |
| 2,160,430 | Bukolt | May 30, 1939 |
| 2,194,004 | Bukolt | Mar. 19, 1940 |

FOREIGN PATENTS

| Number | Country | Date |
|---|---|---|
| 1,014 | Great Britain | Jan. 14, 1910 |
| 4,922 | Great Britain | Mar. 3, 1903 |